United States Patent [19]
Mittendorf et al.

[11] Patent Number: 5,209,388
[45] Date of Patent: May 11, 1993

[54] PROCESS FOR BONDING CARBONACEOUS BODIES

[75] Inventors: Donald L. Mittendorf, Mesa, Ariz.; Gary A. West, Dover, N.J.

[73] Assignee: Allied-Signal Inc., Morris Township, Morris County, N.J.

[21] Appl. No.: 766,466

[22] Filed: Sep. 26, 1991

[51] Int. Cl.$^5$ .................. C03C 27/08; B23K 20/16
[52] U.S. Cl. ..................... 228/121; 228/263.12; 228/234; 228/209; 428/634
[58] Field of Search ............ 228/209, 120, 121, 122, 228/198, 193, 263.12, 234; 428/634, 636, 656

[56] References Cited

U.S. PATENT DOCUMENTS

| Re. 31,369 | 9/1983 | Devine, Jr. | 228/220 |
|---|---|---|---|
| 2,979,814 | 4/1961 | Steinberg | 228/198 |
| 3,024,522 | 3/1962 | Cacciotti | 428/634 |
| 3,878,425 | 4/1975 | Katz | 228/120 |
| 3,973,920 | 8/1976 | Tadokoro et al. | 428/656 |
| 4,764,435 | 8/1988 | Hozizaki et al. | 228/263.12 |
| 5,008,160 | 4/1991 | Jenkin | 428/656 |

FOREIGN PATENT DOCUMENTS 61-127676 6/1986 Japan .................... 228/122

OTHER PUBLICATIONS

Re, Ru Phase Diagram from p. 1956 of vol. 2 of American Society For Metals, 1986.

*Primary Examiner*—Richard K. Seidel
*Assistant Examiner*—Jeanne M. Elpel
*Attorney, Agent, or Firm*—Joseph R. Black; James W. McFarland; Robert A. Walsh

[57] ABSTRACT

A diffusion bonding process for bonding one rhenium-coated carbonaceous body to another. The rhenium-coat surfaces 18,20 of the bodies are coated with ruthenium, and the bodies are diffusion bonded at the interface formed by adjoining ruthenium coats 22,24.

17 Claims, 1 Drawing Sheet

PROCESS FOR BONDING CARBONACEOUS BODIES

TECHNICAL FIELD

The present invention relates generally to bonding processes and more specifically to diffusion bonding. Still more specifically, the invention relates to a process for bonding one carbonaceous body to another.

BACKGROUND OF THE INVENTION

In both terrestrial and extraterrestrial environments, there are applications for devices constructed from a combination of components which are predominantly comprised of carbon. These applications arise from the desire to operate a system at temperatures which are considerably higher than those in which the system typically operates. For example, a component of a thrust-vectoring system for a rocket may be comprised of a metal which has acceptable mechanical properties so long as the temperature of the metal does not exceed some threshold. This may necessitate the use of a cooling system for the metal, whereas the cooling system could be eliminated if the metal were replaced with a more temperature-resistant material.

Carbon composites are known to have exceptional mechanical strength at high temperatures. However, carbon is susceptible to corrosion, oxidation, and erosion. Rhenium resists such effects and exhibits useful properties at such temperatures. However, in addition to being costly, rhenium has a relatively high density. High cost is undesirable in any application, and high density is particularly undesirable in aerospace applications.

Accordingly, considerable effort has been directed toward the replacement of metal components with rhenium-coated carbon components. Testing has shown that the forementioned corrosion, oxidation, and erosion can be minimized by applying a thin coating of rhenium on the composite by chemical vapor deposition (hereinafter, "CVD"). It has also been shown that rhenium can be diffusion bonded in the solid state. However, such bonding requires very high pressures. If performed on rhenuim-coated carbonaceous components the process tends to crack the components due to the brittle nature of the carbon composite, particularly where the components are relatively thin structures such as laminae. Moreover, such bonding requires that the components be maintained at a high temperature for a relatively long period of time. During that period, the diffusion of carbon into the rhenium causes embrittlement of the latter, which decreases load-bearing capacity to the extent that the rhenium layers may not survive the bonding process. An objective of the present invention is to provide a diffusion bonding process that overcomes these limitations.

SUMMARY OF THE INVENTION

This invention achieves the above-stated objective by providing a process that enables diffusion bonding of rhenium-coated carbonaceous bodies at compressive loads and diffusion periods which are substantially lower than those used to effect rhenium-to-rhenium diffusion bonding.

The inventive process comprises the steps of coating the conformal bonding surfaces of two carbonaceous bodies with rhenium, coating the rhenium-coat surfaces with ruthenium, orienting the bodies so that the ruthenium-coat surfaces are in adjoining relation whereby a bonding interface is formed, and pressing the bodies together at the interface while heating the bodies as needed until the bodies cohere at the interface.

The information contained in the accompanying drawings is incorporated herein by reference thereto.

DESCRIPTION OF THE PREFERRED EMBODIMENT

Figure 1:
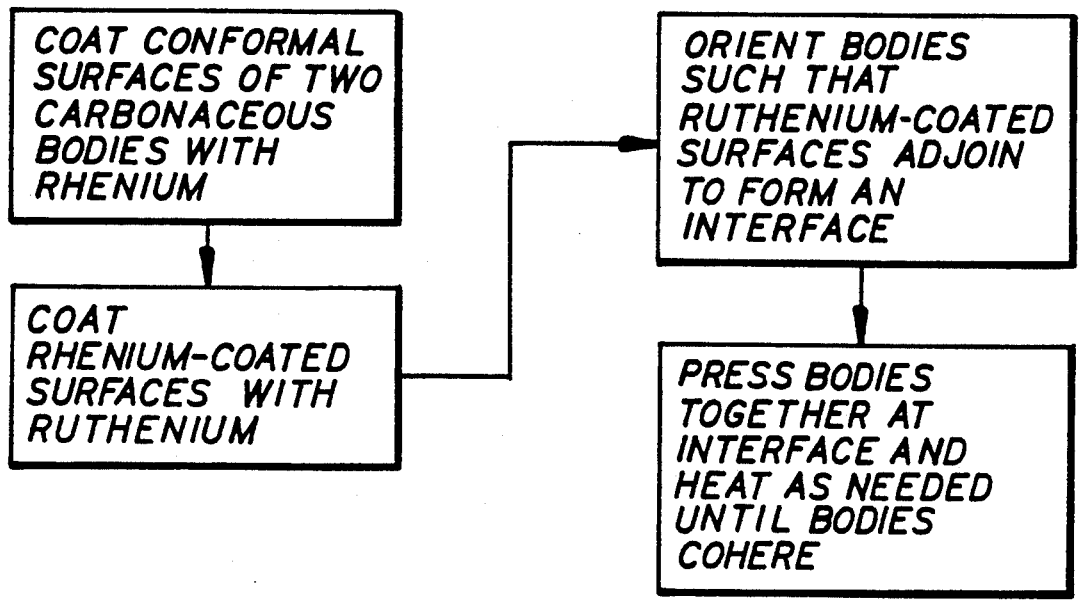
FIG. 1 is a flowchart illustrating essential steps in the bonding process which is more particularly described hereinafter.
Figure 2:
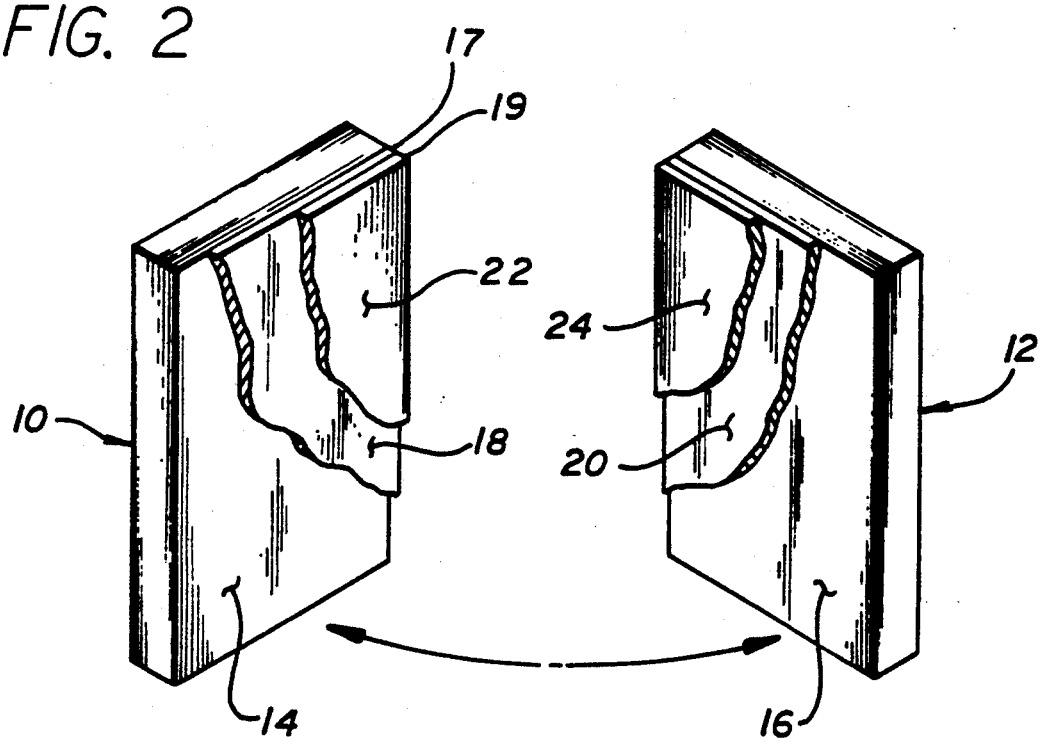
FIG. 2 is a perspective and partially fragmentary view included to facilitate description.

FIG. 2 illustrates two bodies 10,12 having the shape of parallelepipeds. Each of the bodies 10,12 is predominantly comprised of carbon, and each has a bonding surface (as at 14) which is conformal with a bonding surface (as at 16) of the other. Prior to use of the bonding process of the invention, the bonding surfaces 14,16 are prepared by any applicable method to be both smooth and conformal. For linear surfaces such as those 14,16 illustrated, conformity (in the illustrated case, parallelism) should be at least about 0.0005 inch per inch length. Smoothness is obtained by polishing with an abrading material, the latter of which can have a grit size ranging from 40 (e.g. aluminum oxide paper) to 400 (e.g. silicon carbide paper).

To begin the process, a uniform coat 17 (greatly exaggerated in the drawing) of substantially pure rhenium metal is deposited on the bonding surfaces 14,16 to a thickness of 0.003 inch ±0.001 inch. This is typically accomplished by CVD using chloride or fluoride precursors. In a typical application, all surfaces of each of the bodies 10,12 would be coated.

The rhenium-coat bonding surfaces 18,20 are then cleaned by sequential immersion in 1,1,1-trichloroethane and 2- propanol or equivalent non-polar and polar solvents.

Next, a uniform coat 19 (greatly exaggerated in the drawing) of ruthenium is formed on the rhenium-coat bonding surfaces 18,20. An eye-dropper, pipette, or functionally similar device is used to deposit a layer of a solution of $RuCl_3$ and methanol onto the surfaces. This is done several times between intermittent drying cycles until an $RuCl_3$ film of about 100 micro-inch thickness is accumulated on each rhenium-coat bonding surface.

In an evacuated hot-press furnace, the bodies are heated from room temperature to 500° C. at a rate of 10° C. per minute. The temperature is held at 500° C. for thirty minutes, and is then increased at a rate of 10° C. per minute to 600° C., followed by an additional holding period of thirty minutes at 600° C. This first thermal cycle liberates the chlorine from the $RuCl_3$ film, leaving ruthenium metal at the interface, and is performed in a vacuum of at least 0.0002 torr.

Next, the bodies 10,12 are oriented so that the ruthenium-coat bonding surfaces 22,24 are in adjoining relation, thus forming an interface between the bodies. Care should be exercised to ensure that the bonding surfaces are not contaminated during handling. The bodies are pressed together at the interface and maintained under a compressive load of between 700 pounds/square inch ("PSI") and 1200 PSI.

While maintaining the compressive load, the bodies are further heated from 600° C. to 2400° C. at a rate of 50° C. per minute, followed by a fifteen-minute holding period at 2400° C. This second thermal cycle is performed in a vacuum of at least 0.0001 torr, and forces the bodies to cohere at the interface. At the end of the cycle, the compressive load is removed and the assembly is permitted to cool to room temperature.

The ruthenium coating may alternatively be provided by CVD using a carbonyl precursor. Decomposition of the $Ru_3(Co)_{12}$ during the CVD process eliminates the need for the above-described first thermal cycle. The temperature of the bodies is increased from room temperature to 2400° C. at a rate of 50° C. per minute followed by a fifteen minute holding period at 2400° C.

The above-described coating thicknesses can be expected to vary with the maximum temperature to which the bodies are to be subjected in use. That is, the optimal coating thicknesses are application-specific. Since compression time and temperature are affected by coating thickness, the above-described holding periods and, to a lesser degree, the 2400° C. temperature, can also be expected to vary with the requirements of a particular application.

The process should be applicable to carbonaceous bodies of various amorphous-to-crystalline content, and has been successfully demonstrated with DFP-3 and AXF-5Q, which are carbon material designations of POCO GRAPHITE, INC..

It should be understood that although the bonding surfaces must be smooth and conformal, they need not be macroscopically linear as illustrated in FIG. 2. The process can be used to join a concave surface to a convex surface, for example.

The foregoing portion of the description is not intended to restrict the invention to the preferred embodiment thereof, or to specific details which are ancillary to the teaching contained herein. The invention should be construed as broadly as is consistent with the following claims and their substantial equivalents.

What is claimed is:

1. A diffusion bonding process for bonding a first carbonaceous body to a second carbonaceous body at an interface formed between substantially conformal bonding surfaces formed on the bodies, comprising the steps of:
   depositing a first coating that comprises rhenium onto the bonding surfaces to form a rhenium-coat surface on each of the bodies;
   depositing a second coating that comprises ruthenium onto the rhenium-coat surfaces to form a ruthenium-coat surface on each of the bodies;
   orienting the bodies so that the ruthenium-coat surfaces are in adjoining relation, whereby the interface is formed; and
   pressing the bodies together at the interface and simultaneously heating the bodies until the bodies cohere at the interface.

2. The process of claim 1 wherein deposition of the second coating is performed by means including chemical vapor deposition of ruthenium on the rhenium-coat surfaces, using a carbonyl precursor.

3. The process of claim 2 wherein the compressive load to which the bodies are subjected during performance of the pressing and heating step does not exceed about 1500 PSI.

4. The process of claim 3 wherein the first coating consists essentially of rhenium.

5. The process of claim 4 wherein the pressing and heating step comprises heating the bodies to a temperature of about 2400° C.

6. The process of claim 1 wherein deposition of the second coating is performed by means including intermittent application of a plurality of layers of $RuCl_3$ onto the rhenium-coat surfaces.

7. The process of claim 6 wherein the compressive load to which the bodies are subjected during performance of the pressing and heating step does not exceed about 1500 PSI.

8. The process of claim 7 wherein the first coating consists essentially of rhenium.

9. The process of claim 8 wherein the pressing and heating step comprises heating the bodies to a temperature of about 2400° C.

10. The process of claim 6 further comprising the step of removing chlorine from the applied $RuCl_3$ prior to performance of the pressing and heating step.

11. The process of claim 1 wherein the first coating consists essentially of rhenium.

12. The process of claim 11 wherein the second coating consists essentially of ruthenium.

13. The process of claim 11 wherein the pressing and heating step comprises heating the bodies to a temperature of about 2400° C.

14. The process of claim 13 wherein the compressive load to which the bodies are subjected during performance of the pressing and heating step does not exceed about 1500 PSI.

15. The process of claim 11 wherein the second coating consists essentially of $RuCl_3$.

16. The process of claim 15 wherein the pressing and heating step comprises heating the bodies to a temperature of about 2400° C.

17. The process of claim 16 wherein the compressive load to which the bodies are subjected during the pressing and heating does not exceed about 1500 PSI.

* * * * *